United States Patent [19]

Mraz et al.

[11] Patent Number: 4,860,878
[45] Date of Patent: Aug. 29, 1989

[54] COLLAPSIBLE CONVEYOR SUPPORT STRUCTURE/CARRIER

[75] Inventors: Dennis Mraz; Donald R. Skuce, both of Saskatoon, Canada

[73] Assignee: D M Enterprises Inc., Saskatoon, Canada

[21] Appl. No.: 186,131

[22] Filed: Apr. 26, 1988

[51] Int. Cl.$^4$ .............................................. B65G 41/00
[52] U.S. Cl. .................................... 198/309; 198/594; 198/812; 198/861.2
[58] Field of Search ............... 198/303, 309, 588, 594, 198/812, 861.2; 193/35 TE

[56] References Cited

U.S. PATENT DOCUMENTS

| | | | |
|---|---|---|---|
| 2,576,217 | 11/1951 | Eggleston | 198/812 |
| 2,590,359 | 3/1952 | Zopf | 193/35 TE |
| 3,268,060 | 8/1966 | Long | 198/309 |
| 4,245,738 | 1/1981 | Butcher et al. | 198/812 |

FOREIGN PATENT DOCUMENTS 2167372  5/1986  United Kingdom ................ 198/812

*Primary Examiner*—Joseph E. Valenza
*Attorney, Agent, or Firm*—Welsh & Katz, Ltd.

[57] ABSTRACT

An extensible support system for endless conveyor belts and the like has a plurality of pairs of generally transversely aligned primary and secondary interconnected members, a plurality of flexible restrictive members, such as chains, secured between successive primary and secondary members to restrict the spacing of the members at their lower ends, transverse members interconnecting portions of the generally transversely aligned pairs of primary and secondary members, and a plurality of conveyor belt and the like supporting elements supported by pairs of either the primary or secondary members. A carrier for the pluralities of primary and secondary members is provided, which includes a pair of longitudinally extending rail members on which the primary or secondary members are supported and guided during movement to and from an extended position. A cable support system is additionally provided in which the cable supports are horizontally pivotable allowing the cable to form loops during retraction for neatly supporting the cable and the cable supports in a nested arrangement.

7 Claims, 5 Drawing Sheets

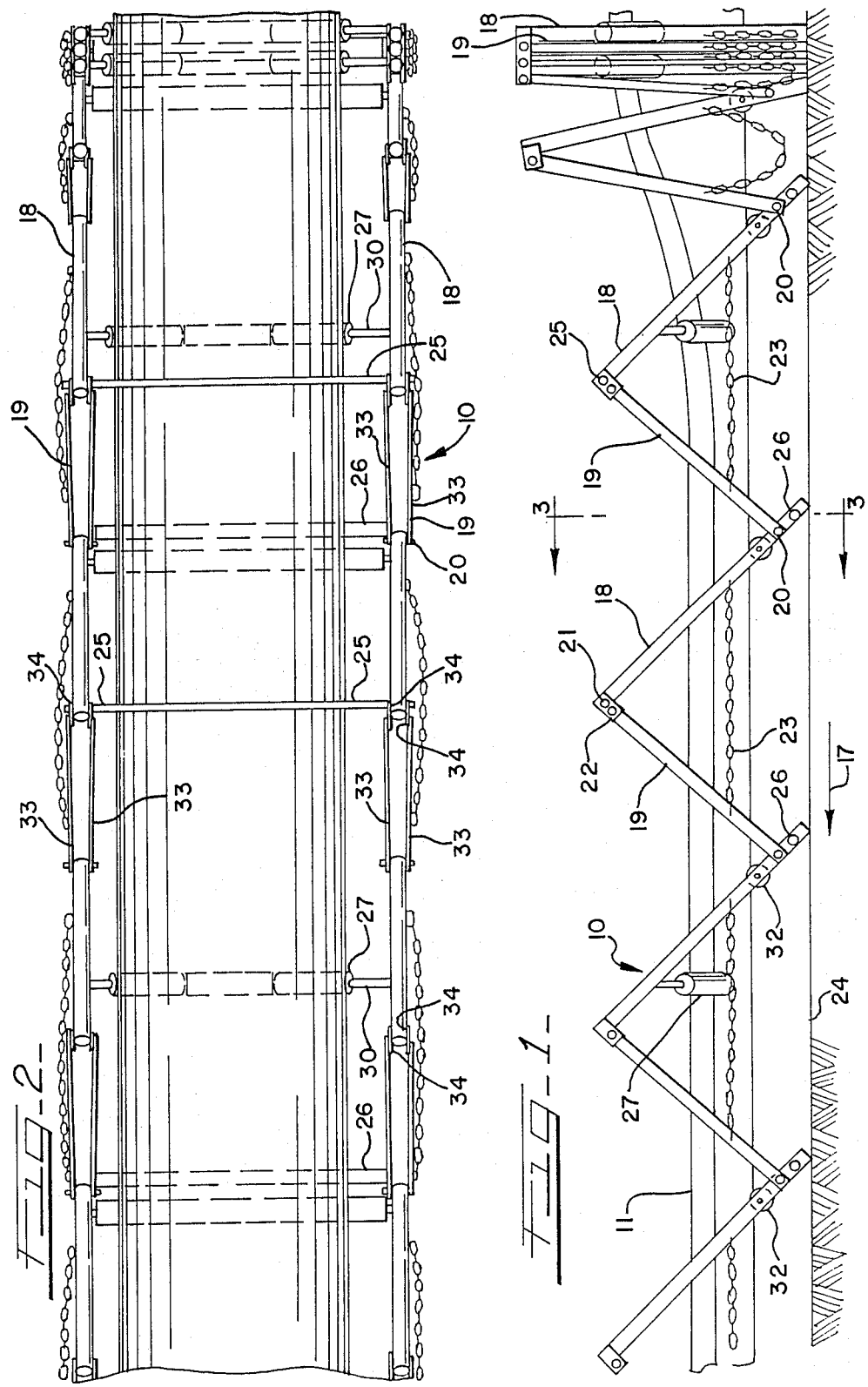

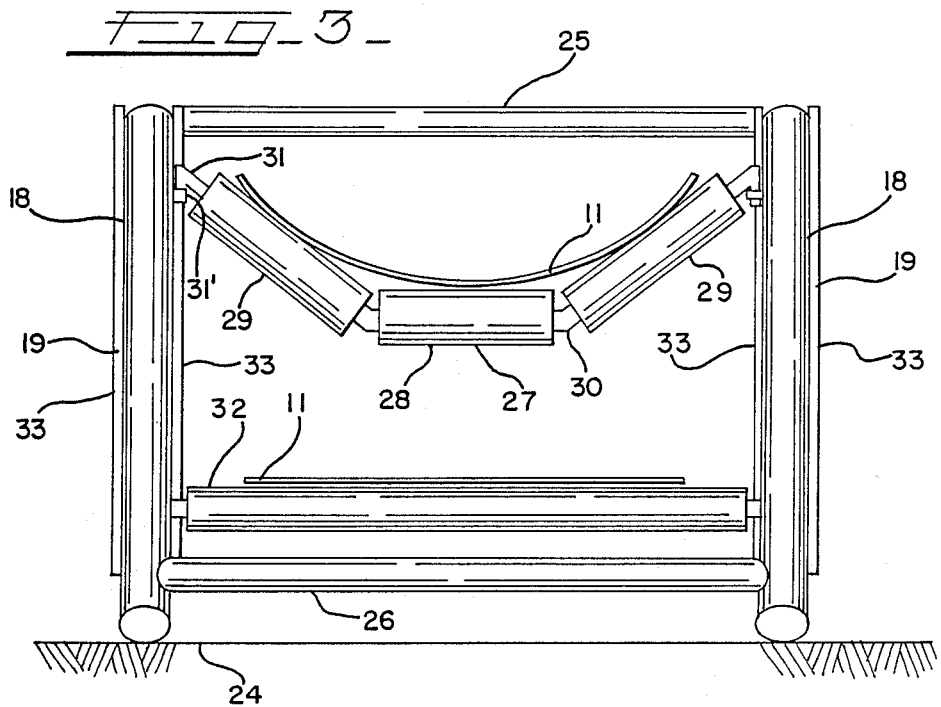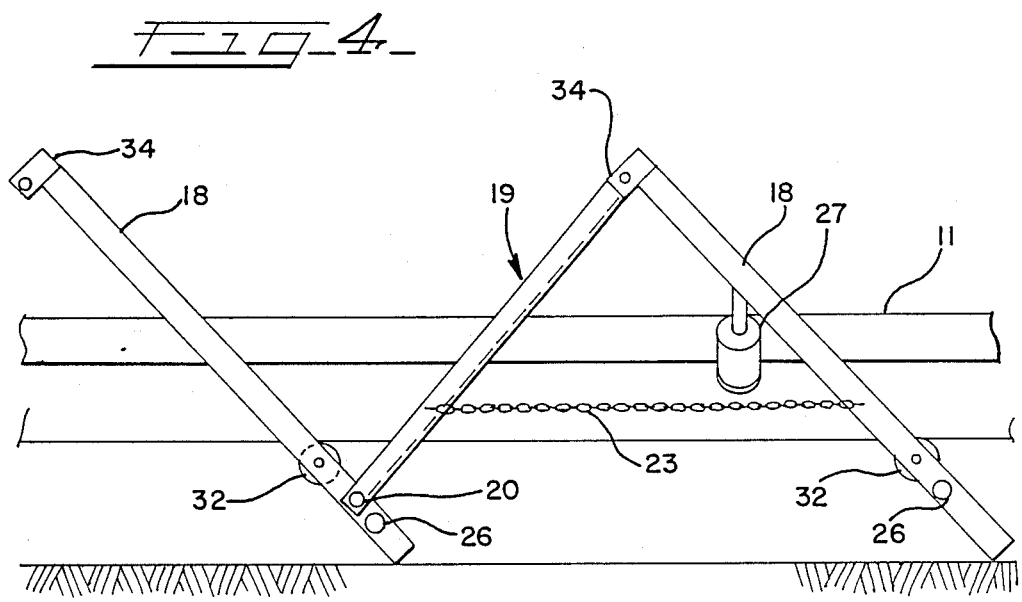

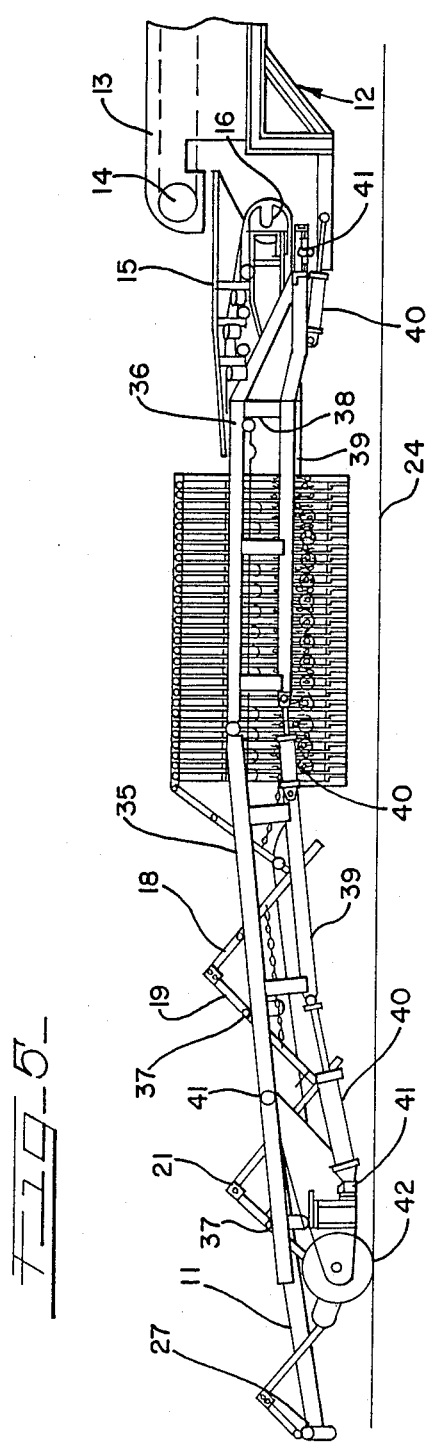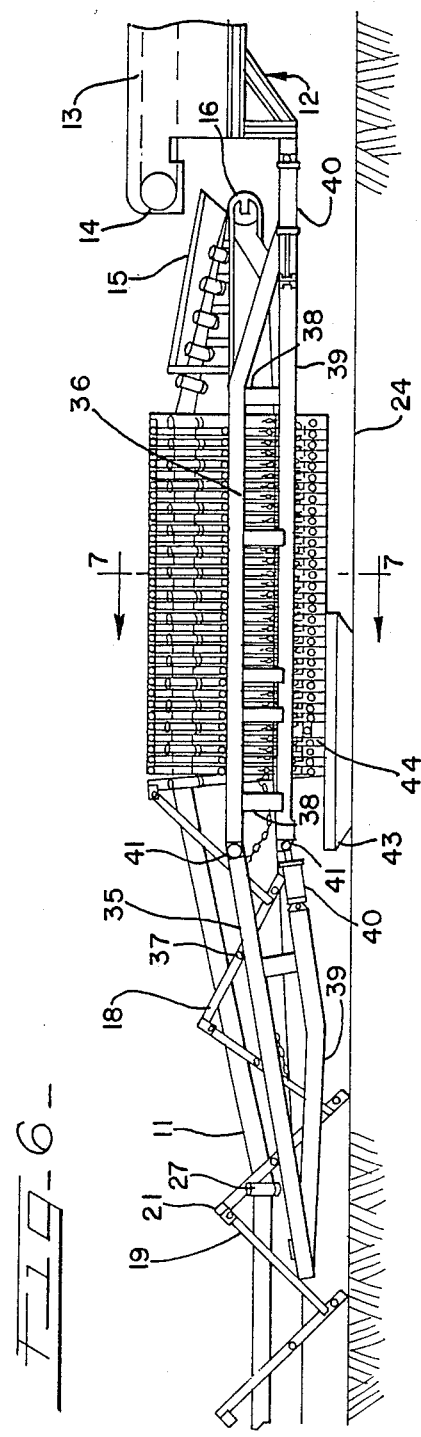

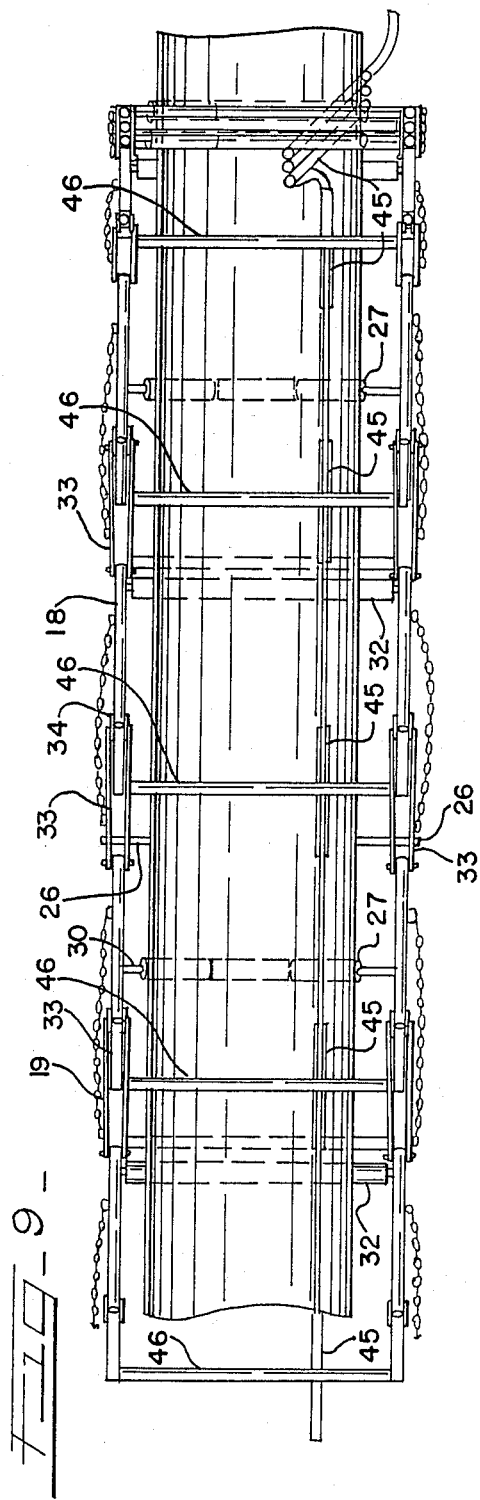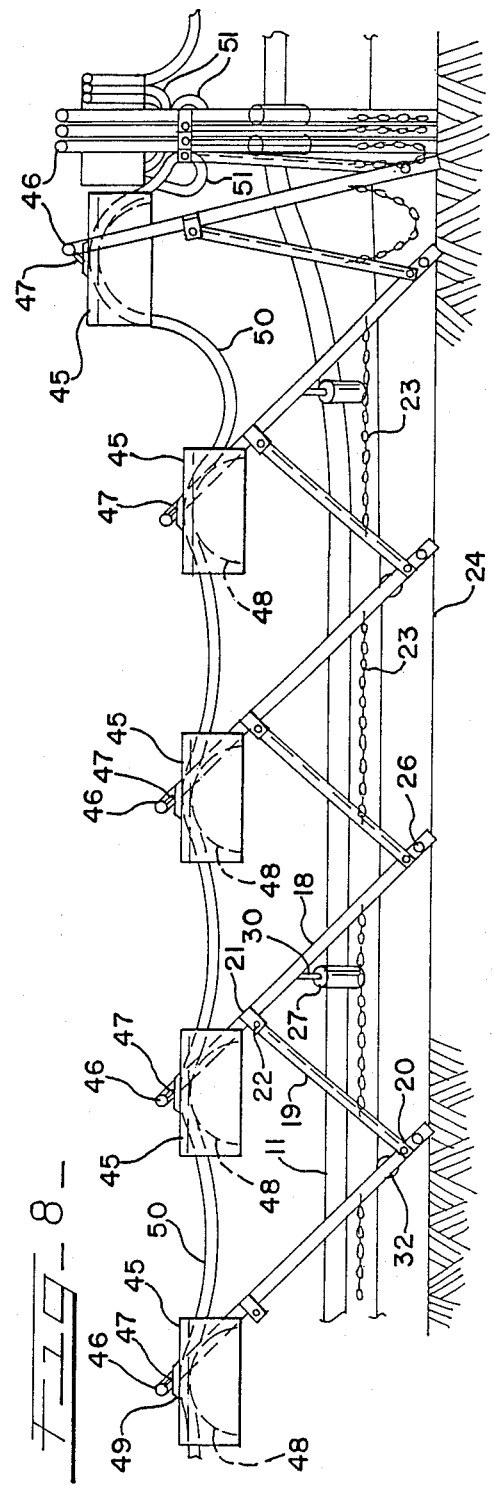

COLLAPSIBLE CONVEYOR SUPPORT STRUCTURE/CARRIER

FIELD OF THE INVENTION

This invention relates to extensible belt conveyors and the like devices and particularly to a system for supporting conveyor belts and the like in an extensible system.

BACKGROUND OF THE INVENTION

In endless conveyor belt systems and the like, for example those used in mining operations, independent support stands, i.e., unconnected, except perhaps when retracted or being stored are commonly utilized to support endless conveyor belts and the like. These stands, for example, of the type referred to as pin connected trailing stands, or "pin-pull" type stands, may have diagonally disposed or "snowplow" floor engaging members so that the stands can be nested in a retracted position. The stands are slid along the surface in a group with the stands connected to each other by means of pins. When it is desired to deploy the stands, the pin or pins are pulled and the stands separated and spaced from each other into position.

Deployment of the "pin-pull" type stands is difficult and requires considerable manual effort. Sliding the stands into a nested or retracted position requires additional effort, first to ensure the proper nesting of the stands, and then to align the stands in order to reconnect the pins as each stand is moved into position. Proper spacing of these stands is difficult to maintain as such spacing requires operator judgment and attention. Occasionally during use, one or more stands may tilt and fall causing material to be spilled, occasional damage to the stands and the conveyor belt or the like, and loss of production while the conveyor belt or the like system is inoperative. Furthermore, as the number of stands in a system increase, the force required to slide the stands along the floor will increase until the strength of the brackets and pins holding the stands together may be exceeded, or the towing vehicle may lose traction attempting to overcome the tension of the conveyor belt and the like and the frictional drag of the stands. The "snowplow" configuration of the stands, desirable for nesting, further increases the frictional drag during forward movement of the system, while the difficulty of moving and aligning the stands increases to an even greater extent upon retracting or collecting the stands into the nested position.

A belt conveyor supporting system having individual stands, is illustrated in U.S. Pat. No. 4,245,738, wherein nested stands or stools are deployed spaced from each other.

The free-standing or "pin-pull" type stands are not generally satisfactory in modern mining techniques, particularly where an extensible conveyor-belt system is to be used along an angled path, or to turn a corner, frequently to turn a corner of as much as 90°. The described stand units in the nested condition cannot readily be moved along an angled path or caused to turn corners.

In conveyors for other purposes, usually lightweight conveyors, for example in orchards and for handling packages, cartons, and the like, various tong or parallelogram type extendable conveyor supports have been proposed U.S. Pat. Nos. 2,590,359 and 3,294,216 are illustrative of these light-weight conveyors. In the support-system in U.S. Pat. No. 2,590,359 a rigid, collapsible frame is utilized having a collapsed and erected position, permitting operation only in the latter. The system employs connecting links having toggle action, which determines the spacing between floor supported members. The supporting frame for the conveyor is substantially rigid when erected, generally precluding bends or turns in the system when extended. An extensible boom using a scissors-type tong arrangement is utilized in U.S. Pat. No. 3,294,216 for extension of a spring conveyor and another structure, such as a cage, from a base. In such arrangement, bends and turns of the conveyor are not contemplated and floor support of intermediate elements of the system are not provided. Such intermediate support elements are required for supporting a conveyor belt handling heavy loads, such as mined material.

While specialized systems have been proposed for enabling conveyor belts and the like to assume a curved path, these systems, for example as shown in U.S. Pat. No. 4,260,053, do not lend themselves to extensible conveying of loose or broken material of considerable weight, such as mined material. Supporting the conveyor at its ends or providing occasional intermediate support, does not provide sufficient support for conveyor belts and the like for heavy loading, as encountered in mining for example.

Therefore, one object of the present invention is to provide an improved longitudinally extensible support system for endless conveyor belts and the like.

Another object of the present invention is to provide a longitudinally extensible support system for endless conveyor belts and the like in which the support members are interconnected and have improved stability as compared to conveyor belt support stands commonly utilized in the mining industry.

A further object of the invention is to provide a longitudinally extensible support system for endless conveyor belts and the like which can be automatically deployed.

Still another object of the present invention is to provide an extensible support system for supporting endless conveyor belts and the like for operation while contracted and extended.

A further object of the invention is to provide an extensible support system for endless conveyor belts and the like for supporting members of the system above the floor surface when the members are in the retracted position to facilitate movement of the system.

A still further object of the present invention is to provide an extensible support system for conveyor belts and the like which also support a cable while the system is in the retracted and extended positions.

These and other objects and advantages of the present invention will be readily apparent to those skilled in the art from the following description.

SUMMARY OF THE INVENTION

In general, the objects and purposes of the invention are met by providing an extensible support system for endless conveyor belts and the like having a plurality of pairs of generally transversely aligned primary and secondary interconnected members, a plurality of flexible restrictive means secured between successive primary and secondary members, pluralities of transverse members interconnecting portions of the generally transversely aligned pairs of primary members, and a plurality of conveyor belt and the like supporting elements supported by pairs of either the primary or secondary members for supporting conveyor belts and the like while the system is in an extended position or in a retracted position. Either one of the or both of the pluralities of primary and secondary members are adapted to rest on a supporting surface to support the system. The flexible restrictive means, which can be chains or straps, restrict the spacing of the members at their lower ends when in the extended position. Each of the primary elongated members is pivotally secured at a lower portion to one of the secondary members adjacent to it on one longitudinal side thereof, each have an upper connecting portion spaced from its lower portion, and each is pivotally secured at its upper connecting portion to the upper end portion of the secondary member adjacent to it on the other longitudinal side thereof. Consequently, the primary and secondary members are extendable at an angle therebetween in the extended position with the angle being determined by the restrictive means secured between successive primary and secondary members which are pivotally secured to each other at the upper connecting portion of the primary member and the upper end portion of the secondary member.

Preferably, the primary elongated members have a length greater than the length of the secondary members and the secondary members are pivotally secured at their marginal end portions to the adjacent primary elongated members. In a preferred arrangement, the primary members are tubular, and the secondary members are pairs of elongated planar members positioned adjacent and pivotally secured at their marginal end portions to transverse sides of adjacent primary members. This preferred arrangement permits the system to be assembled of relatively commonly available parts and for the members to be compactly stored in the retracted position, as will be hereinafter described.

In another embodiment of the present invention, at least one of the pluralities of pairs of elongated primary and secondary members are supported by carrier means at least when the members are in the retracted position, for movement with the carrier means. The carrier means can include a pair of longitudinally extending rail members on which at least one of the pluralities of pairs of elongated primary and secondary members are supported in the retracted position and along which the members are guided during movement to and from an extended position. In one arrangement, the carrier means includes means for supporting the carrier means upon a supporting surface, such as a mine floor, for rolling movement along the surface; while in another arrangement the carrier means includes means for supporting the carrier means for sliding movement along the supporting surface. In this embodiment, the support system can be automatically extended by causing the forward end of the pairs of elongated members to be pulled forwardly along and forward of the carrier means with the pairs of members being deployed along a support surface, such as a mine floor.

In another embodiment of the invention, the system includes cable support means in addition to the plurality of conveyor belt and the like supporting elements. Particularly, selected elongated primary members have cable supporting means for supporting a cable during extension and retraction of the system. Preferably, the cable supporting means includes a cable support having a radial surface which supports the cable along the radial surface, and further includes clamping means for retaining the position of the cable with respect to the cable support while the system is retracted and during retraction and extension of the system. Most preferably, the cable supporting means are horizontally pivotable allowing the cable supporting means to support the cable along the radial supporting surfaces during retraction, while successive cable supporting means are urged into a nesting arrangement, with the cable being formed into loops, such as FIG. 8 loops, at the catenary curve portions between cable supporting means as the cable supporting means are pivoted away from being longitudinally aligned, so that the cable and the cable support means are compactly stored in the retracted position.

The operation and construction of the support system of the present invention will be further understood from the following description of the drawings and preferred embodiments.

BRIEF DESCRIPTION OF THE DRAWINGS

FIG. 1 is a partly fragmentary, elevational view of one embodiment of the present invention supporting a conveyor belt;

FIG. 2 is a top plan view of the embodiment shown in FIG. 1;

FIG. 3 is a sectional view taken along line 3—3 in FIG. 1;

FIG. 4 is an enlarged view of a portion of the view shown in FIG. 1;

FIG. 5 is an elevational view of another embodiment of the present invention;

FIG. 6 is an elevation view of still another embodiment of the present invention;

FIG. 8 is an elevational view of a fourth embodiment of the present invention;

FIG. 9 is a top plan view of the embodiment shown in FIG. 8.

DETAILED DESCRIPTION OF THE PREFERRED EMBODIMENTS

Figure 7:
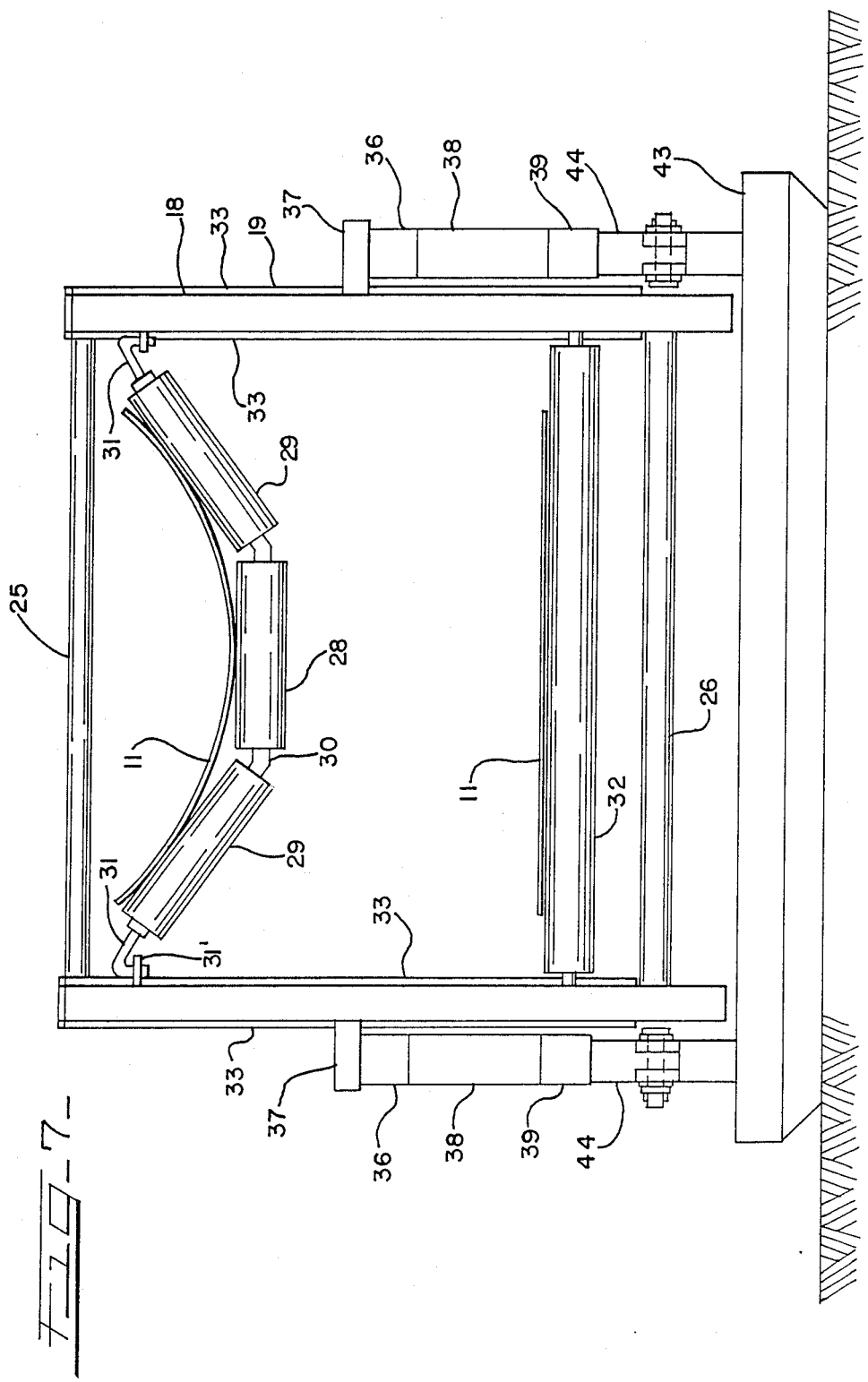
FIG. 7 is a sectional view taken along line 7—7 in FIG. 6.

Referring to the drawings, the reference numeral 10 generally indicates a support system for an extensible endless conveyor belt, generally designated as 11, capable of being inserted into a conveyor belt system such as would, for example, follow a continuous miner. As illustrated in FIGS. 5 and 6, the support system 10 can be mounted behind a towing machine, generally indicated by reference numeral 12, which, for example, can be a mining machine, a feeder or a feeder breaker, which for illustration is partially shown as having a conveyor belt 13 trained about a pulley 14 for conveying material to endless conveyor belt 11. A hopper 15 is supported by towing machine 12, beneath the discharge of belt 13 and its pulley 14, to direct the material discharged from belt 13 to endless conveyor belt 11. Endless conveyor belt 11 is trained about and driven by a tail pulley 16, supported, for example, by the towing machine 12, and is trained about a second pulley (not shown) at the other end of its run, in the manner commonly known to the art. Alternatively, belt 11 can be driven by the second pulley (not shown), and in such case, tail pulley 16 may be a non-driven or idler pulley.

In the embodiment shown in FIGS. 1-4, support system 10 which is extendable generally in the longitudinal direction, illustrated by arrow 17, includes generally transversely aligned pairs of elongated primary members 18 and secondary members 19. Each of the primary elongated members 18 is pivotally secured, for example by a rivet 20, at a lower portion of the primary member to an elongated secondary member 19 which is adjacent to member 18 on one longitudinal side of member 18. Each of elongated primary members 18 have an upper connecting portion, as at 21, spaced from its lower portion and its lower pivotal connection with a secondary member 19. Upper connecting portion 21 can be at the upper marginal end portion of primary member 18 as shown in FIGS. 1–7, but alternatively can be at an intermediate portion of the primary member. Each of the primary elongated members 18 are pivotally secured, as by a second rivet 22, to the upper end portion of the secondary member which is adjacent to the primary member 18 on its other longitudinal side. As a result of the generally transversely aligned primary and secondary elongated members being interconnected as described, the primary and secondary members are extendable from a retracted position in which they are disposed generally parallel to each other, as illustrated in the right-hand portion of FIGS. 1 and 2, to the extended position illustrated in the left-hand portions of FIGS. 1 and 2, where they are disposed at an angle to each other.

Support system 10 further includes a plurality of chains 23 which are secured between successive primary members 18 and secondary members 19 pivotally secured to each other at the upper connecting portion 21 of the primary member 18 and the upper end portion of the secondary member 19. Chains 23 are preferably mounted to the outer sides of the members 18 and 19 so that in the retracted position chains 23 will not interfere with the members 18 and 19 achieving a generally parallel position, as shown at the right-hand portion of FIGS. 1 and 2. Chains 23 serve as flexible restrictive means in support system 10 to restrict successive primary and secondary members from being spread apart in the longitudinal direction at their lower ends for more than a predetermined distance, when in the extended position, as illustrated in FIGS. 1 and 4. As shown in those figures, the height of endless conveyor belt 11 above the supporting surface, such as mine floor 24, is determined by the extended length of chains 23 when the support system 10 is in the extended position. The distance or angle between successive primary and secondary members is also determined by the length of chains 23. Thus, the angle or distance between the primary and secondary members can be shortened by shortening the chains 23, or can be increased by increasing the length of the chains 23.

Support system 10 further includes a first plurality of elongated third or transverse members 25 disposed transversely and interconnecting portions of the generally transversely aligned pairs of primary members 18. Members 25 can interconnect and provide rigid transverse support for each pair of primary members 18 at the top portion of the primary members 18, as shown, or can interconnect another portion of the primary members 18 in a pair, preferably closer to the upper portion than the lower portion.

A second plurality of elongated third or transverse members 26 are disposed transversely and interconnect lower portions of elongated primary members 18 Members 26 provide the rigidity and stability to the lower end portions of the support members in system 10 to prevent misalignment and bending of the members which might otherwise occur.

Support system 10 further includes conveyor belt and the like supporting elements, such as belt or troughing rollers or idlers 27. Rollers or idlers 27 conveniently comprise a generally horizontally disposed center idler 28 and a pair of idlers 29, each disposed outwardly of center idler 28 and angled upwardly from the horizontal, causing the belt 11 to form a trough, as best seen in FIG. 3. The idlers or rollers 28, 29 can be conveniently rotatably journaled on an idler support member 30 which can be secured to the pair of generally transversely aligned elongated primary members, for example, by a hook portion 31 formed at each end of member 30 engaging an eye 31' on the inwardly facing side of each primary member 18. Preferably idlers 28, 29 and idler support member 30 are supported by selected primary members, for example every other pair, at a portion thereof between their connections with the adjacent secondary members. Similarly, return rollers or idlers 32 are supported by selected pairs of generally transversely aligned primary members, by a hook and eye arrangement (not shown) or other arrangement, preferably at a portion thereof near their lower connections with an adjacent secondary member. The return idlers need not be troughing idlers or fastened to carry more than the weight of the conveyor belt as shown in FIG. 3. The several idlers can be supported by the secondary members rather than the primary members, if desired. As particularly shown in FIG. 1 conveyor belt 11 is operationally supported by troughing idlers 27 and return idlers 32, and hence by the support system 10, whether the system is in the retracted position or is in the extended position or is in movement therebetween to deploy or retract the system. However, the belt 11 will be supported at a higher elevation in the retracted position than in the extended position of the supporting members 18, 19 of system 10.

As illustrated in the drawings, primary elongated members 18 are longer than secondary members 19. Primary members 18 are tubular, while secondary members 19 comprise pairs of elongated planar members 33 which are positioned adjacent to and pivotally secured to transverse sides of the adjacent primary member 18 by means of rivets 20 and 22 at the marginal end portions of members 33 to opposing tangential portions of primary elongated members 18. The pivotal connection at the upper connecting portion of primary member 18 includes connecting means extending from connecting portion 21 to which is secured the pair of elongated planar members 33. As shown, the connecting means of members 18 includes at least one member extending from upper connecting portion 21 toward the next adjacent primary member to which is secured the pair of planar members 33 comprising member 19. As shown, the connecting means can be a pair of relatively short planar members 34 extending from upper connecting portion 21 toward the next adjacent primary member 18 on the other longitudinal side of the primary member. The relatively short planar members 34 are secured to transverse sides of upper connecting portion 21 of primary elongated member 18 and are pivotally secured to respective ones of the pair of elongated planar members 33 comprising member 19.

Another embodiment of the present invention, as shown in FIG. 5, with elements common to the first embodiment being shown by like reference numerals and having the same description as above, includes carrier means, such as a carrier, generally shown by reference numeral 35, for supporting the elongated primary members 18 at least in the retracted position and during deployment. It should be understood that the secondary members 19 could be supported by carrier 35 rather than the primary members 18. Carrier 35 comprises a pair of generally longitudinally extending rail members 36 on which the elongated primary members 18, and hence the secondary members 19 connected therewith, are supported in the indicated positions. Elongated primary members 18 have hanger bars 37 which extend outwardly and generally transversely from members 18, and serve as supporting means for supportingly engaging one of the pair of rail members 36 for support on the rail members during retraction and extension therealong and while in the retracted position. Rail members 36 are supported by generally upright struts 38 and beam members 39, both rail members 36 and beam members 39 being articulated and steerable away from the longitudinal direction through hydraulic cylinders 40 and swivels or pivots 41. Carrier means 35 is supported upon the supporting floor surface 24 by wheels 42, only one of which is shown in FIG. 5, but at least a pair of wheels 42 can be present to support the carrier 35. As will be apparent from the foregoing, the carrier 35, and hence support system 10 supported thereon, is readily steerable along and away from the longitudinal extension of the carrier and system by adjustment of hydraulic cylinders 40 positioned on either side of the pair of beam members 39 to selectively steer carrier 35 and system 10.

In another embodiment illustrated in FIGS. 6 and 7, the rail and beam member arrangement similar to the embodiment in FIG. 5 is employed, but rather than wheels 42 being utilized, rail members 36, beam members 39 and support system 10 are supported by a sliding base 43 connected to the pair of beam members 39 by means of a pair of hydraulic cylinders 44. Thus, the supporting members of support system 10 are supported by and guided along rail members 36, and the entire system is moved by sliding the sliding base 43 along floor surface 24. Rail members 36 and beam members 39 are raised and lowered through the extension of hydraulic cylinders 40 and 44 to accommodate deployment and retraction of the supporting members 18 and 19 as illustrated in the drawing. As in the previous embodiment, the direction of system 10 can be changed from the horizontal by adjusting the hydraulic cylinders 40 to swivel rail members 36 about their swivels or pivots 41.

Still another embodiment of the invention is shown in FIGS. 8 and 9, which basically utilizes the conveyor belt and the like support system of any of the embodiments heretofore described, but is shown in FIGS. 8 and 9 for the purpose of illustration only with the embodiment described with respect to FIGS. 1–4. In this embodiment, a cable supporting system is provided for supporting a cable in and during extension and retraction of the support system 10. Cable supports, generally indicated by reference numeral 45, are supported by the upper portions of elongated primary members 18. For this purpose, the upper connecting portion 21 of members 18 is spaced from the upper end of the members 18, for example, by having the members 18 considerably longer than provided in the previous embodiments. Transverse bars or hangers 46 are secured to pairs of transversely aligned members 18 to provide support members. Cable support 45 is suspended from hanger 46 by means of a hook 47 depending from hanger 46, to which the cable support 45 is journaled, which allows the generally rectangular cable support 45 to pivot about the hook in a generally horizontal plane. Cable supports 45 have a radial surface 48 and a clamp 49 to clamp cable 50 being supported by radial surface 48 to retain the position of cable 50 with respect to the radial surface 48 of cable support 45 during retracting and during extension of the support system 10. As in any cable support system wherein a cable is supported by spaced supports, the cable forms a series of catenaries between the supports, as illustrated in the left-hand portion of FIG. 8. In the embodiment of the present invention, the clamping of cable 50 to the radial surface 48 of the cable support 45 and the pivoting of cable supports 45 as described, upon retraction of the primary members 18 and the secondary members 19 to reach the fully retracted position, causes the cable to create loops 51, such as FIG. 8 loops, between cable supports 45 while cable supports 45 are urged into a side-by-side nesting arrangement as shown in the right-hand portions of FIGS. 8 and 9. Upon the system 10 being extended, cable 50 assumes the regular intervals between cable supports 45, with the latter pivoting into longitudinal alignment, allowing the extension of cable 50 as required. It is understood that more than one cable can be suspended from elongated members 18 by employing additional cable supports 45 and hooks 47 transversely spaced along hangers 46.

In accordance with the present invention, the extensible support system through its integral transverse support longitudinal structural bracing and interconnection has greater stability than the support stand arrangements heretofore known, and the frequent tipping and spilling encountered with the prior systems is virtually completely eliminated. Furthermore, the system of the present invention permits automatic deployment and spacing of support elements, as the support members are lineally connected. By employing variable lengths of the elongated members, the support system can provide variable transition to accommodate varying conveyor profile requirements. Through the use of the carrier arrangements described herein, tractive effort in moving the support system is considerably less than the frictional drag encountered in towing and maneuvering of the previously developed support systems. The reduction in the tractive effort permits a greater number of support members to be utilized in the current system than the limited number of stands employed in the previously developed support systems.

As heretofore noted, the embodiments of the present invention utilizing a carrier provides the support system with the ability to be steered away from a straight longitudinal direction, and to provide cornering by operation of hydraulic cylinders, particularly if steerable wheels are employed to support the carrier on the mine floor. The ability of the rails of the carrier to be raised and lowered facilitates the deployment, of the support members, for example by advancing the towing machine with the outward or rearward end of the rails lowered, so the lower ends of the support member arrangement are successively guided off the rails onto the mine floor and are deployed in spaced relationship on the floor. Similarly, to retract the support member arrangement and load the same on the carrier, the rails can be lowered and the towing machine backed up to cause the support elements to be guided along the rails into vertically parallel, nested relation.

The utilization of the cable support embodiment of the present invention provides for cable support and storage without the cable becoming tangled or interfering with the retraction and deployment of the conveyor belt and the like support system.

Various changes coming within the spirit of the invention may suggest themselves to those skilled in the art; hence the invention is not limited to the specific embodiments shown or described and uses mentioned, but the same is intended to be merely exemplary, the scope of the invention being limited only by the appended claims.

We claim:

1. A longitudinally extensible support system for endless conveyor belts and the like, which are extendable in a generally longitudinal direction, comprising a plurality of pairs of primary and secondary interconnected elongated members disposed generally parallel to each other in a retracted position, each of said primary elongated members being adapted at its lower end to rest upon a supporting surface and each being pivotally secured at a lower portion to one of said secondary members adjacent thereto on one longitudinal side thereof, each of said primary elongated members having an upper connecting portion spaced along the member from its lower portion, each of said primary elongated members being pivotally secured at its upper connecting portion to the upper end portion of the secondary member adjacent thereto on the other longitudinal side thereof, each of said secondary members comprising a pair of elongated planar members positioned adjacent and pivotally secured to transverse sides of successive primary members, and said primary and secondary members being extendable at an angle therebetween from a retracted position wherein said members are generally parallel to each other, a plurality of flexible restrictive means each secured between successive primary members and secondary members which are pivotally secured to each other at the upper connecting portion of the primary member and the upper end portion of the secondary member, said restrictive means being adapted to restrict successive primary and secondary members from being spread apart in a generally longitudinal direction at their lower ends when in the extended position for more than a predetermined distance, a first plurality of elongate third members disposed transversely and interconnecting the upper portions of generally transversely aligned pairs of primary members, a second plurality of elongated third members disposed transversely and interconnecting the lower portions of said generally transversely aligned pairs of primary members, and a plurality of conveyor belt and the like supporting elements supported by at least selected ones of said pairs of elongated primary and secondary members between said interconnecting of successive primary and secondary members, said supporting elements being adapted to support conveyor belts and the like while the system is in an extended position or in a retracted position.

2. A support system as defined in claim 1, wherein said pair of elongated planar members are pivotally secured at their marginal end portions to said successive primary members.

3. A support system as defined in claim 4, wherein said primary elongated members are tubular, and said pairs of elongated planar members are pivotally secured to individual primary elongated members at opposing tangential portions thereof.

4. A support system as defined in claim 5, wherein each of said primary members have connecting means extending from said upper connecting portion thereof to which is secured said pair of elongated planar members comprising the successive secondary member on the other longitudinal side of the primary member.

5. A support system as defined in claim 4, wherein said connecting means comprises at least one member extending from said upper connecting portion of the primary member toward the next adjacent primary member on the other longitudinal side of the primary member.

6. A support system as defined in claim 4, wherein said connecting means comprises a pair of relatively short planar members secured to transverse sides of said upper connecting portions of the primary elongated member, each of said pair of elongated planar members being pivotally secured to respective ones of the pair of relatively short planar members.

7. A support system as defined in claim 3, wherein at least selected ones of said primary and secondary members have cable support means in addition to said plurality of conveyor belt and the like supporting elements.

* * * * *